United States Patent
Fukuda et al.

(10) Patent No.: US 10,774,190 B2
(45) Date of Patent: Sep. 15, 2020

(54) ION-CONDUCTING MEMBRANE PRODUCTION METHOD AND PRODUCTION DEVICE

(71) Applicant: Toray Industries, Inc., Tokyo (JP)

(72) Inventors: Seiji Fukuda, Otsu (JP); Yuko Yabuuchi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 262 days.

(21) Appl. No.: 16/074,145

(22) PCT Filed: Feb. 1, 2017

(86) PCT No.: PCT/JP2017/003629
§ 371 (c)(1),
(2) Date: Jul. 31, 2018

(87) PCT Pub. No.: WO2017/141710
PCT Pub. Date: Aug. 24, 2017

(65) Prior Publication Data
US 2020/0262990 A1    Aug. 20, 2020

(30) Foreign Application Priority Data

Feb. 15, 2016    (JP) .................................. 2016-025632

(51) Int. Cl.
*C08J 5/22*    (2006.01)
*B01J 47/00*    (2017.01)

(52) U.S. Cl.
CPC ............. *C08J 5/2218* (2013.01); *B01J 47/00* (2013.01); *C08J 5/2287* (2013.01)

(58) Field of Classification Search
CPC ......... C08J 5/2218; C08J 5/2287; B01J 47/00
USPC ........................................................ 521/27
See application file for complete search history.

(56) References Cited

U.S. PATENT DOCUMENTS

2011/0290180 A1    12/2011    Leitner et al.

FOREIGN PATENT DOCUMENTS

| DE | 10 2008 050 704 A1 | 4/2010 |
|---|---|---|
| JP | 09-302487 A | 11/1997 |
| JP | 2003-245615 A | 9/2003 |
| JP | 2004-123971 A | 4/2004 |
| JP | 2006-095346 A | 4/2006 |
| JP | 2006-307163 A | 11/2006 |
| JP | 2007-262346 A | 10/2007 |
| JP | 2011-194593 A | 10/2011 |
| JP | 2013-056993 A | 3/2013 |
| JP | 2013056993 | * 3/2013 |

OTHER PUBLICATIONS

C.G. Arges et al., "The Chalkboard: Anion Exchange Membrane Fuel Cells" *The Electrochemical Society Interface*, Jan. 1, 2010, pp. 31-35.

Extended European Search Report dated Aug. 20, 2019, of counterpart European Application No. 17752973.2.

* cited by examiner

*Primary Examiner* — Hui H Chin
(74) *Attorney, Agent, or Firm* — DLA Piper LLP (US)

(57) ABSTRACT

A method of producing an ion-conducting membrane containing a polymer having an ionic group, involves multiple liquid treatment steps in which a precursor membrane is brought into contact with an acid treatment solution or an alkali treatment solution, the precursor membrane containing a polymer in a state in which the aforementioned ionic group forms a salt with an impurity ion, wherein the liquid treatment time in the second and subsequent liquid treatment steps of the multiple liquid treatment steps is shorter than the liquid treatment time in the initial liquid treatment step.

19 Claims, 4 Drawing Sheets

ION-CONDUCTING MEMBRANE PRODUCTION METHOD AND PRODUCTION DEVICE

TECHNICAL FIELD

This disclosure relates to a method and a device that produces an ion-conducting membrane.

BACKGROUND

Ion-conducting membranes typified by ion-exchange membranes, polymer electrolyte membranes and the like are functional membranes having ion conductivity and electron insulating properties. Ion-exchange membranes include cation-exchange membranes having cation conductivity and anion-exchange membranes having anion conductivity. Cation-exchange membranes and anion-exchange membranes are widely used in the field of electrolytic industries based on the combination of properties of both the membranes, and are also beginning to be used in applications requiring high-quality membranes such as pharmaceutical manufacturing.

Recently, use of polymer electrolyte membranes having hydrogen ion conductivity and hydroxide ion conductivity is also expected to expand. Polymer electrolyte membranes are used in polymer electrolyte fuel cells that convert hydrogen or hydrocarbons into electric energy, hydrogen production devices that produce hydrogen from water, electrochemical hydrogen compressing devices and the like as a catalyst coated membrane including an electrolyte membrane and a catalyst applied or transferred to the electrolyte membrane, or a membrane electrode assembly including a catalyst coated membrane and electrodes attached to the catalyst coated membrane. For promotion of diffusion of fuel cells and utilization of hydrogen energy, not only quality improvement of polymer electrolyte membranes, but also a low-cost mass production method and a low-cost production device for polymer electrolyte membranes are desired.

Ion-exchange membranes and polymer electrolyte membranes that are ion-conducting membranes usually contain a polymer having an ionic group. Methods of introducing an ionic group into a polymer are roughly divided into a method of polymerizing a polymer using a monomer having an ionic group, a method of introducing an ionic group into a polymer by a polymeric reaction, and a method of forming a membrane of a polymer and then introducing an ionic group into the membrane-shaped polymer likewise by a polymeric reaction. Since the ionic group is in a state of a salt (ion pair) with a counter ion such as a metal ion or a halogen ion in the course of the synthesis reaction, in those methods, it is necessary to finally convert an ion-conducting membrane capable of exhibiting its functions by exchanging a metal ion with a hydrogen ion by acid treatment or exchanging a halogen ion with a hydroxide ion by alkali treatment. Hereinafter, a membrane that contains a polymer containing a salt of the ionic group with an impurity ion and a counter ion and that is in a state before being converted into an ion-conducting membrane by liquid treatment with an acid solution or an alkali solution is referred to as a "precursor membrane."

In the production of an ion-conducting membrane by the above-mentioned method, any metal ions or halogen ions remaining as impurities in the ion-conducting membrane cause deterioration of ion conductivity and electron insulating properties as well as deterioration of durability. To reduce the concentration of impurity ions such as metal ions and halogen ions in the ion-conducting membrane, however, it is necessary to use a large amount of treatment solution in the liquid treatment, which prevents reductions in its production cost. As a technique to reduce the amount of use of the treatment solution, Japanese Patent Laid-open Publication No. 2013-56993 discloses, as a method of producing a polymer electrolyte membrane including, in acid treatment, immersing a precursor membrane in an acidic solution a plurality of times, a liquid treatment method for a hydrocarbon polymer electrolyte membrane including cascade-conveying a film to a plurality of immersion tanks filled with an acidic solution, and continuously supplying the acidic solution while overflowing the acidic solution in a cascade method in a direction opposite to the film conveying direction.

When immersing a precursor membrane in an acidic solution a plurality of times as described in JP '993, however, the immersion time is prolonged in proportion to the number of times of immersion, and the size of the liquid treatment tanks is also increased in proportion to the number of times of immersion.

It could therefore be helpful to provide a production method of producing an ion-conducting membrane with reduced impurities in a short time as well as a downsized device that produces an ion-conducting membrane capable of reducing the amount of use of the treatment solution.

SUMMARY

We thus provide:

Our method of producing an ion-conducting membrane is a method of producing an ion-conducting membrane containing a polymer having an ionic group, the method including: a plurality of times of liquid treatment steps of bringing a precursor membrane that contains a polymer containing a salt of the ionic group with an impurity ion into contact with an acid treatment solution or an alkali treatment solution, wherein in the plurality of times of liquid treatment steps, a liquid treatment time in each of second and subsequent liquid treatment steps is shorter than a liquid treatment time in a first liquid treatment step.

Our device that produces an ion-conducting membrane is a device that produces an ion-conducting membrane containing a polymer having an ionic group, the device including: a plurality of liquid treatment tanks for bringing a precursor membrane that contains a polymer having the ionic group capable of forming a salt with an impurity ion into contact with an acid treatment solution or an alkali treatment solution, wherein in the plurality of liquid treatment tanks, second and subsequent liquid treatment tanks are smaller than a first liquid treatment tank.

It is possible to produce an ion-conducting membrane with reduced impurity ions in a short time, and to downsize the production device.

BRIEF DESCRIPTION OF THE DRAWINGS

FIGS. 4(A) to 4(C) are schematic views showing various examples in which a treatment solution overflowed from a

DESCRIPTION OF REFERENCE SIGNS

M: Precursor membrane
1: First liquid treatment tank
2: Second liquid treatment tank (small)
3: Third liquid treatment tank (small)
4: Liquid treatment tank
5: Liquid supply tank
6: Liquid sending pump
7: Conveying roll (submerged roll)
8: Conveying roll (upper roll)
9: Sprinkling shower nozzle (both sides)
10: Direction of overflow
11: Conveying direction of precursor membrane
12: Direction of rotation axis
13: Overflow
14: Flow on surface of treatment solution
15: Flow of treatment solution

DETAILED DESCRIPTION

Our method produces an ion-conducting membrane containing a polymer having an ionic group, the method including: a plurality of times of liquid treatment steps of bringing a precursor membrane that contains a polymer containing a salt of the ionic group with an impurity ion into contact with an acid treatment solution or an alkali treatment solution, wherein in the plurality of times of liquid treatment steps, a liquid treatment time in each of second and subsequent liquid treatment steps is shorter than a liquid treatment time in a first liquid treatment step.

The precursor membrane turns into an ion-conducting membrane at some stage of the plurality of liquid treatment steps. For convenience, a membrane before completion of any of the plurality of liquid treatment steps is referred to as a precursor membrane, and a membrane after completion of all the plurality of liquid treatment steps is referred to as an ion-conducting membrane.

Hereinafter, the method of producing an ion-conducting membrane (hereinafter sometimes simply referred to as the "production method") will be described with reference to examples of the production device shown in FIGS. 1 and 2 as appropriate, but these examples of the production device do not limit this disclosure at all.

The basic structure of the polymer contained in the ion-conducting membrane is not particularly limited, and preferable examples thereof include fluoropolymers typified by perfluoroalkylene, and polymers having an aromatic hydrocarbon skeleton such as polyphenylene oxide, polyether ketone, polyether ether ketone, polyether sulfone, polyether ether sulfone, polyether phosphine oxide, polyether ether phosphine oxide, polyphenylene sulfide, polyamides, polyimides, polyether imides, polyimidazoles, polyoxazoles, and polyphenylenes. Examples of the basic skeleton also include polymers and copolymerized polymers obtained by polymerizing styrene, ethylstyrene, vinylpyridine, vinylpyrazine, divinylbenzene, divinyltoluene, divinylxylene, trivinylbenzene and the like. A polymer having an ionic group is a polymer including the above-mentioned basic structure and an ionic group bonded to the basic skeleton.

Ionic groups are roughly divided into cationic groups and anionic groups. In a cation-exchange membrane having cation conductivity, a polymer having an anionic group is used, and an anionic group and a cation form an ion pair to produce a cation-exchange capacity. In an anion-exchange membrane having anion conductivity, a polymer having a cationic group is used, and a cationic group and an anion form an ion pair to produce an anion-exchange capacity.

The anionic group of the polymer having an anionic group is not particularly limited as long as it has a cation-exchange capacity and exerts cation conductivity. Preferable examples of the anionic group include a sulfonic acid group ($-SO_2(OH)$), a sulfate group ($-OSO_2(OH)$), a sulfonimide group ($-SO_2NHSO_2R$ (wherein R represents an organic group)), a phosphonate group ($-PO(OH)_2$), a phosphate group ($-OPO(OH)_2$), a carboxylic group ($-CO(OH)$), and a perfluorosulfonic acid group ($-O-(CF_2)-SO_2(OH)$). The polymer having an anionic group may have two or more of these groups. The polymer having an anionic group more preferably has any of a sulfonic acid group including a perfluorosulfonic acid group, a sulfonimide group, a sulfate group, and a phosphonate group since they have high hydrogen ion conductivity, and most preferably has a perfluorosulfonic acid group or a sulfonic acid group from the viewpoint of resistance to hydrolysis.

The cationic group of the polymer having a cationic group is not particularly limited as long as it has an anion-exchange capacity and exerts anion conductivity. Preferable examples of the cationic group include tertiary amino groups, quaternary ammonium groups, tertiary phosphonium groups, and quaternary phosphonium groups. The polymer having a cationic group may have two or more of these groups. The polymer having a cationic group more preferably has either a quaternary ammonium group or a quaternary phosphonium group since they have high hydroxide ion conductivity.

In general, in the production of an ion-conducting membrane, most of ionic groups in a precursor membrane are ionically bonded to impurity ions and present in the form of a salt. The impurity ions are finally removed by acid treatment or alkali treatment, and thus an ion-conducting membrane is obtained.

For example, in a polymerization reaction of a polymer having an anionic group or an addition reaction of introducing an anionic group into a polymer, a metal cation is used as a catalyst, and the metal cation remains as an impurity ion in the precursor membrane immediately after the reaction. Examples of the metal cation include cations of Li, Na, K, Rb, Cs, Mg, Ca, Sr, Ba, Ti, V, Mn, Fe, Co, Ni, Cu, Zn, Zr, Mo, and W. Among these, alkali metal or alkaline earth metal cations are often used. From the viewpoint of price and environmental load, cations of Li, Na, K, Ca, Sr, and Ba are preferably used, and cations of Li, Na, and K are most preferably used.

Similarly, in a synthesis reaction of a polymer having a cationic group, an anion that is a counter ion to a metal cation used as a reaction catalyst forms an ionic bond with a cationic group in the polymer, and the anion remains as an impurity ion in the precursor membrane. Examples of the anion include sulfate ions, nitrate ions, halogen ions, carbonate ions, and hydrogen carbonate ions. When a cationic group is introduced into a polymer by a polymeric reaction, a halogenoalkyl group is often used as a functional group that undergoes an exchange reaction with a cationic group. In this case, a halogen ion such as a chloride ion or a fluoride ion forms an ionic bond with the cationic group in the polymer and remains as an impurity ion in the precursor membrane.

Although not particularly limited, typically, ionic groups in an amount of 50% or more of the ion exchange capacity of the ion-conducting membrane are present in a state of being bonded to the impurity ions in the precursor membrane.

The production method includes a plurality of times of liquid treatment steps of bringing a precursor membrane into contact with an acid treatment solution or an alkali treatment solution (hereinafter sometimes collectively simply referred to as a "treatment solution"). In the liquid treatment step, impurity ions contained in the precursor membrane are removed by ion exchange. Typically, a precursor membrane having an anionic group is subjected to liquid treatment with an acidic solution and undergoes ion exchange with a hydrogen ion to turn into a cation-exchange membrane, and a precursor membrane having a cationic group is subjected to liquid treatment with an alkali solution and undergoes ion exchange with a hydroxide ion to turn into an anion-exchange membrane. Alternatively, it is also possible to subject a precursor membrane having a cationic group to liquid treatment with a solution of a weak acid such as carbonic acid and ion-exchange the cationic group with a carbonate ion or a hydrogen carbonate ion to turn the precursor membrane into an anion-exchange membrane. Although not particularly limited, it is preferable to perform the ion exchange in the liquid treatment step so that ionic groups present in the form of a salt account for 0.1% or less of the ion exchange capacity of the ion-conducting membrane after completion of a plurality of times of liquid treatment steps of the precursor membrane.

The method of bringing the precursor membrane into contact with the treatment solution may be a method of immersing a long precursor membrane in a treatment solution tank while continuously conveying the precursor membrane. In the example shown in FIG. 1, a long precursor membrane wound into a roll is continuously conveyed to a plurality of liquid treatment tanks and immersed in a treatment solution. It is also possible to employ a method of cutting the precursor membrane into sheets and immersing the sheets in treatment solution tanks in a batch method, but a method of continuously conveying the precursor membrane is preferable from the viewpoint of productivity. The precursor membrane may be continuously conveyed alone, or the precursor membrane attached to a conveyance film may be conveyed if the precursor membrane is insufficient in strength or for easy handling. Alternatively, the precursor membrane may be reinforced with a porous membrane or a filler for the purpose of further improving the durability of the membrane.

The acid treatment solution for the cation-exchange membrane is not particularly limited as long as it is a treatment solution of a strong acid, and an aqueous solution of an inorganic acid such as hydrochloric acid, sulfuric acid, phosphoric acid, or nitric acid is suitable. Sulfuric acid is particularly preferable from the viewpoint of productivity and workability. For efficient conversion to hydrogen ions, it is preferable that the acid treatment solution have a hydrogen ion concentration of 1.0 mol/L (corresponding to pH=0.0) or more. For a precursor membrane having an ionic group density of 1 meq/g (=1 equivalent/kg) or more, the acid treatment solution more preferably has a hydrogen ion concentration of 2.0 mol/L (corresponding to pH=−0.3) or more. That is, the pH of the acid treatment solution is preferably 0.0 or less, and for a precursor membrane having an ionic group density of 1 meq/g or more, the pH is more preferably −0.3 or less. The water used to dilute the strong acid is preferably purified water, distilled water, RO water, or deionized water containing reduced cationic impurities by removal thereof.

The liquid treatment step is performed a plurality of times. In the example shown in FIG. 1, an unwound precursor membrane is subjected to liquid treatment in a first liquid treatment tank, liquid treatment in a second liquid treatment tank, and liquid treatment in a third liquid treatment tank, that is, a total of three liquid treatment steps. A plurality of times of liquid treatment can improve the utilization efficiency of the treatment solution for removing impurity ions in the precursor membrane as well as reduce impurity ions remaining in the ion-conducting membrane. A plurality of times of liquid treatment can also reduce the frequency of replacing the treatment solution and thus reduce the amount of use of the treatment solution. It is preferable that the amount of impurity ions remaining in the ion-conducting membrane be finally reduced to 100 ppm or less.

In the production method, the liquid treatment time for bringing the precursor membrane into contact with the treatment solution by immersion in each of second and subsequent liquid treatment steps can be made shorter than the liquid treatment time in a first liquid treatment step (first liquid treatment time) since most of the impurity ions have already undergone ion exchange in the first liquid treatment step. Part of the liquid treatment steps among the second and subsequent liquid treatment steps may be shortened, but it is preferable that all of the liquid treatment steps among the second and subsequent liquid treatment steps be shortened. This is because the effect of shortening the entire liquid treatment steps is more remarkably exhibited.

In the method of producing an ion-conducting membrane, it is preferable that the liquid treatment time in each of the second and subsequent liquid treatment steps be two-thirds or less of the liquid treatment time in the first liquid treatment step. The production method is more preferably a method in which, in all the liquid treatment steps among the second and subsequent liquid treatment steps, the liquid treatment time is two-thirds or less of the liquid treatment time in the first liquid treatment step. As a result, it is possible to further shorten the second and subsequent liquid treatment steps, improve the mass production efficiency, and downsize the treatment solution tanks.

If all the liquid treatment times in the second and subsequent liquid treatment steps are shortened to one-half of the first liquid treatment time and the liquid treatment is performed three times, the liquid treatment time of the three times is shortened to a liquid treatment time corresponding to two times of liquid treatment, and a shortening effect of 33% can be obtained. The same effect can be obtained also in downsizing of the treatment solution tanks. As shown in FIG. 2, when the liquid treatment is performed three times, and a second liquid treatment tank (small) 2 and a third liquid treatment tank (small) 3 are downsized to about one-half of a first liquid treatment tank 1, the overall size of the treatment solution tanks is reduced. In FIG. 2, a flow 15 of a treatment solution is directed from the third liquid treatment tank (small) 3 to the second liquid treatment tank (small) 2 and then to the first liquid treatment tank 1, and exits from the first liquid treatment tank as a waste treatment solution. A precursor membrane M is conveyed in the order of the first liquid treatment tank 1, the second liquid treatment tank (small) 2, and the third liquid treatment tank (small) 3. A conveying direction 11 of the precursor membrane in FIG. 2 is from the left side of the page to the right side of the page.

From the viewpoint of production efficiency, it is preferable that a plurality of times of liquid treatment steps be performed continuously in a production line that produces an ion-conducting membrane while continuously conveying the precursor membrane. Accordingly, it is preferable that the flow from one liquid treatment step to the next liquid treatment step also continuously proceed in the production line. However, this approach is not necessarily applied and limited only to when an ion-conducting membrane is produced while the precursor membrane is continuously conveyed, and it is also possible to once wash and dry the precursor membrane after one liquid treatment step and then subject the precursor membrane to the next liquid treatment step.

The production method preferably includes, after the plurality of times of liquid treatment steps, a washing step of washing the ion-conducting membrane obtained through the liquid treatment steps to reduce the residual treatment solution in the membrane. In the example shown in FIG. 1, the ion-conducting membrane after three times of the liquid treatment is subsequently conveyed to a washing section and subjected to a washing step. The washing step is preferably performed by immersion of the ion-conducting membrane in washing water. Such an operation may make washing of the precursor membrane more uniform. The washing water is preferably deionized water. Use of deionized water can prevent osmosis of impurity ions such as metal cations and halogen anions contained in washing water into the membrane. It is also preferable to perform an operation of showering deionized water to the ion-conducting membrane in the washing step. This is to facilitate removal of any foreign matter attached to the surface of the precursor membrane.

The method of producing an ion-conducting membrane preferably further includes a drying step of drying the ion-conducting membrane having been subjected to the washing step. In the example shown in FIG. 1, the ion-conducting membrane having been subjected to the washing step is conveyed to a drying section and subjected to a drying step. The drying method in the drying step is not particularly limited, and it is generally preferable to perform hot air drying.

Figure 1:
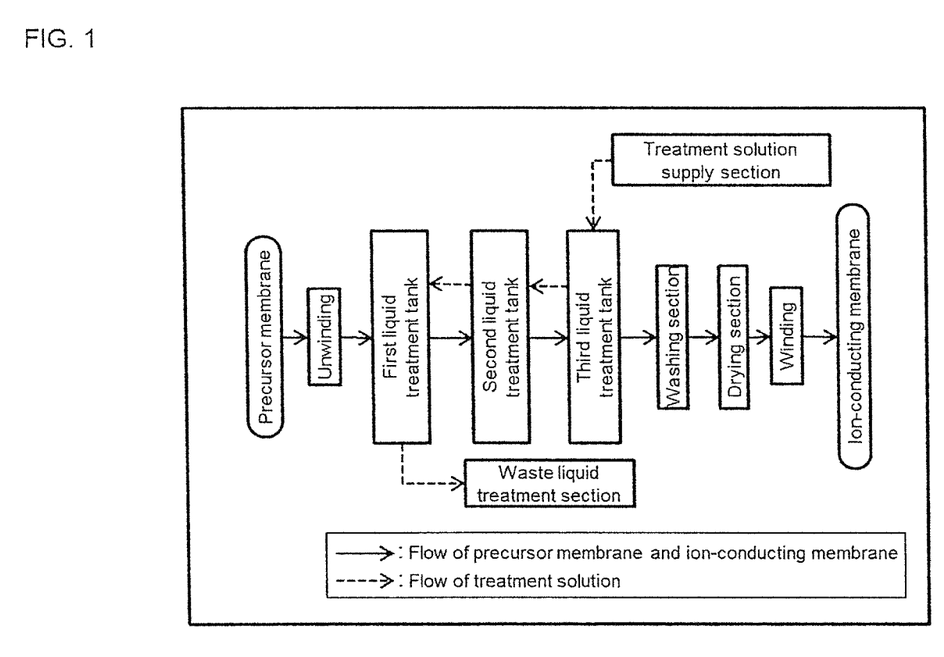
FIG. 1 is a diagram showing one example of a production device for carrying out the production method.
Figure 2:
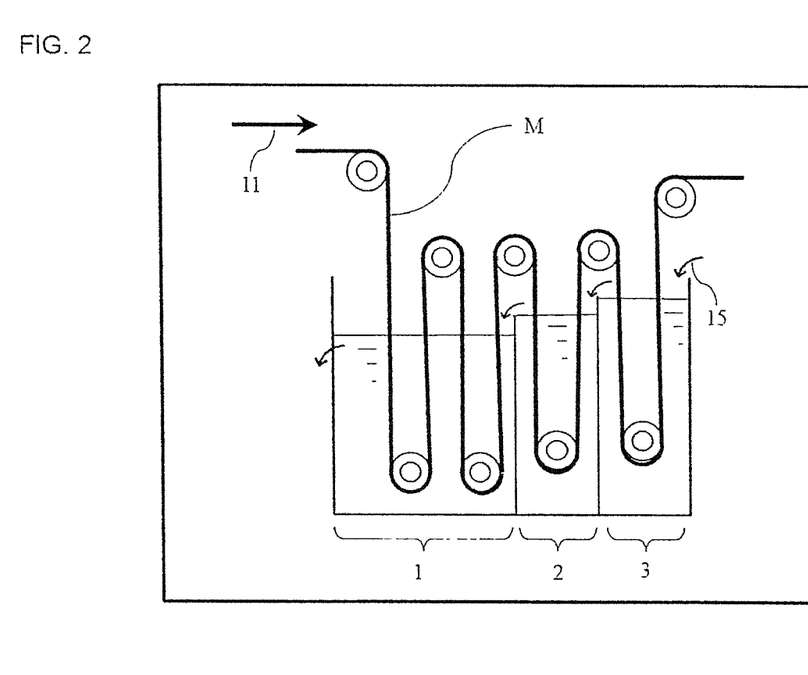
FIG. 2 is a schematic view showing one example of a second liquid treatment tank and a third liquid treatment tank that are smaller than a first liquid treatment tank in the production device shown in FIG. 1.

In the example shown in FIG. 1, the ion-conducting membrane that has passed through the drying section is wound into a roll by a winding roller, whereby the whole process is completed. It is preferable that the ion-conducting membrane be wound with the winding tension being controlled to maintain the roll shape well.

In the example shown in FIG. 1, a treatment solution supply section first supplies a new treatment solution to the third liquid treatment tank. The production device has a configuration in which the treatment solution used in the third liquid treatment tank is then transferred to the second liquid treatment tank, the treatment solution used in the second liquid treatment tank is then transferred to the first liquid treatment tank, and the treatment solution used in the first liquid treatment tank is transferred as a waste liquid to a waste liquid treatment section. Further, during the conveyance of the precursor membrane from the first liquid treatment tank to the third liquid treatment tank, the treatment solution supply section continuously supplies the treatment solution, and the waste liquid is continuously transferred from the first liquid treatment tank to the waste liquid treatment section. Therefore, it is possible to reduce the amount of use of the treatment solution, and improve the efficiency of the production process since it is unnecessary to replace the treatment solution for each liquid treatment tank. From the treatment solution supply section to the first to third liquid treatment tanks, treatment solutions of different concentrations or different compositions may be continuously supplied or circulated and supplied individually.

A device that produces an ion-conducting membrane is a device that produces an ion-conducting membrane containing a polymer having an ionic group, the device including: a plurality of liquid treatment tanks that bring a precursor membrane containing a polymer having the ionic group capable of forming a salt with an impurity ion into contact with an acid treatment solution or an alkali treatment solution, wherein in the plurality of liquid treatment tanks, second and subsequent liquid treatment tanks are smaller than a first liquid treatment tank.

Hereinafter, the device that produces an ion-conducting membrane (hereinafter sometimes simply referred to as the "production device") will be described with reference to examples of the production device shown in FIGS. 3 and 4 as appropriate, but these examples of the production device do not limit this disclosure at all.

A liquid treatment section in the production device has a plurality of liquid treatment tanks in which the conveyed precursor membrane is immersed, and second and subsequent liquid treatment tanks are smaller than a first liquid treatment tank. The phrase that "second and subsequent liquid treatment tanks are small" means that part or all of the second and subsequent liquid treatment tanks have a small internal volume. Preferably, all of the second and subsequent liquid treatment tanks have a small internal volume. If all of the second and subsequent liquid treatment tanks have a small internal volume, the liquid treatment tanks also have an outside volume that is small to substantially the same degree, and the production device can be downsized.

In the device that produces an ion-conducting membrane, the second and subsequent liquid treatment tanks preferably each have an internal volume that is two-thirds or less of the internal volume of the first liquid treatment tank. More preferably, in the production device, all of the second and subsequent liquid treatment tanks each have an internal volume that is two-thirds or less of the internal volume of the first liquid treatment tank.

It is preferable that the conveyance path length in the treatment solution in the second and subsequent small liquid treatment tanks be shorter than the conveyance path length in the treatment solution in the first liquid treatment tank. This is because it is possible to shorten the liquid treatment time and avoid complication of the conveyance path if the conveyance path length is shortened in accordance with the downsizing of the liquid treatment tanks.

It is preferable that the device that produces an ion-conducting membrane include a liquid treatment section for a precursor membrane including a liquid treatment tank and a liquid supply tank adjacent to the liquid treatment tank, and that the device have a mechanism that circulates a treatment solution sent from the liquid supply tank to the liquid treatment tank and overflowed from the liquid treatment tank to the liquid supply tank, and a mechanism that supplies a new treatment solution. When the treatment solution overflows, a flow occurs on the surface of the treatment solution in the liquid treatment tank, and any suspended foreign matter moves to the liquid supply tank together with the overflowed treatment solution and is quickly removed from the liquid treatment tank.

The device that produces an ion-conducting membrane more preferably includes a plurality of liquid treatment tanks, and liquid supply tanks equal in number with the liquid treatment tanks. This is because the device can maintain the capability of removing any suspended foreign matter owing to the supply from the liquid supply tanks even if the amount of a new treatment solution is reduced.

The device that produces an ion-conducting membrane preferably has a mechanism that individually controls the liquid circulating speed from the liquid supply tank to the liquid treatment tank. This is because the device can maintain the capability of removing any suspended foreign matter unless circulation of the treatment solution is stopped even if the supply of a new treatment solution is stopped.

In the device that produces an ion-conducting membrane, a direction in which the treatment solution overflows from the liquid treatment tank is more preferably a direction parallel to a surface of the precursor membrane. Herein, the direction of overflow refers to a direction in which the treatment solution overflows when the liquid treatment tank is viewed from directly above. The direction parallel to a membrane surface refers to a direction substantially parallel to a surface of the precursor membrane at the time the precursor membrane intersects with the surface of the treatment solution, that is, at the time the precursor membrane enters the treatment solution and the precursor membrane gets out of the treatment solution. Therefore, the phrase that "the direction in which the treatment solution overflows from the liquid treatment tank is a direction parallel to a surface of the precursor membrane" means that the direction in which the treatment solution overflows from the liquid treatment tank is substantially parallel to the rotation axis of the conveying roll that conveys the precursor membrane. Since the direction in which the treatment solution overflows is a direction parallel to the membrane surface, the flow on the surface of the treatment solution is substantially parallel to the membrane surface, and any suspended foreign matter also moves in the direction substantially parallel to the membrane surface. In this case, the surface of the precursor membrane is less likely to hinder the movement of any suspended foreign matter so that the suspended foreign matter is removed from the liquid treatment tank more quickly. The examples shown in FIGS. 4(A) and 4(B) are two examples in which a direction 10 in which the treatment solution overflows is parallel to the membrane surface. In FIGS. 4(A) and 4(B), the direction 10 of overflow is in the right side of the page. The treatment solution is supplied by a liquid sending pump 6 from a liquid supply tank 5 to a liquid treatment tank 4, and is overflowed 13 in a direction substantially parallel to the surface of the precursor membrane M conveyed by a conveying roll (submerged roll) 7 and a conveying roll (upper roll) 8 and circulates to the liquid supply tank 5. As a result, any suspended foreign matter also moves substantially parallel to the surface of the precursor membrane M, and is quickly removed from the liquid treatment tank. Arranging a plurality of liquid treatment tanks and a plurality of liquid supply tanks both in the conveying direction of the precursor membrane realizes a state in which the treatment solution overflows from all the liquid treatment tanks in a direction substantially parallel to the membrane surface. The conveying direction of the precursor membrane is a direction in which the precursor membrane is conveyed when the device that produces an ion-conducting membrane is viewed from directly above. FIG. 4(C) shows a liquid treatment section of the production device according to an example viewed from above. A conveying direction 11 of the precursor membrane in FIG. 4(C) is in the upper side of the page. The precursor membrane M is conveyed by four conveying rolls (upper rolls) 8 and conveying rolls (submerged rolls) (not shown because they are submerged in the treatment solution) while being sequentially subjected to liquid treatment in three liquid treatment tanks 4. The surface of the precursor membrane at the time the precursor membrane enters the treatment solution and at the time the precursor membrane gets out of the treatment solution is in parallel relationship to the direction 10 in which the treatment solution overflows. Moreover, the membrane surface is substantially parallel to a direction 12 of the rotation axes of the conveying rolls (upper rolls) 8. Since the direction 10 in which the treatment solution overflows from the liquid treatment tanks 4 to the liquid supply tanks 5 is parallel to the membrane surface, a flow 14 on the surface of the treatment solution is substantially in the same direction as the direction in which the treatment solution overflows, and is substantially parallel to the membrane surface. As a result, it becomes possible to quickly eliminate any suspended foreign matter from the liquid treatment tanks 4 to the liquid supply tanks 5.

It is more preferable that the liquid treatment tank in the production device have a mechanism that showers the treatment solution on both the surfaces of the precursor membrane. This is because even if any suspended foreign matter is attached to the membrane surface, the foreign matter can be easily removed since the precursor membrane is in a wet state. FIG. 4(B) shows an example in which a sprinkling shower nozzle (both sides) 9 is attached to either side of the membrane in the example shown in FIG. 4(A).

The appliance that supplies a new treatment solution in the production device is an appliance capable of continuously supplying a new treatment solution while liquid treatment is performed with conveyance of the precursor membrane. The flow of the treatment solution will be described according to the example shown in FIG. 3. The new treatment solution is supplied from the treatment solution supply section to a liquid supply tank. The treatment solution may be supplied to the liquid supply tank continuously or intermittently during the liquid treatment, and an additional treatment solution may be supplied before the liquid treatment is started or after completion of the liquid treatment. It is preferable to continuously supply the new treatment solution during the liquid treatment of the precursor membrane because the liquid treatment efficiency can be maintained constant. The treatment solution sent from the liquid supply tank to the liquid treatment tank overflows from the liquid treatment tank and circulates to the liquid supply tank. The treatment solution overflowed from the liquid treatment tank, the liquid supply tank, and the entire liquid treatment section is guided to a waste liquid treatment section and subjected to waste liquid treatment.

The treatment solution in the production device can be appropriately selected according to the purpose of the liquid treatment of the precursor membrane, and a treatment solution of a strong acid or a strong alkali is used. It is preferable that the liquid treatment tanks and the liquid supply tanks in the liquid treatment section, the treatment solution supply section, and the waste liquid treatment section shown in FIG. 3, and liquid sending pipes connecting them be formed from a corrosion-resistant material.

The device that produces an ion-conducting membrane preferably includes, following the liquid treatment section, a washing section in which an ion-conducting membrane obtained by liquid treatment of the precursor membrane is washed, a drying section in which the washed ion-conducting membrane is dried, and a winding section in which the dried ion-conducting membrane is wound up. In the example shown in FIG. 3, the unwound precursor membrane is subjected to liquid treatment in liquid treatment tanks and converted into an ion-conducting membrane, and then conveyed to a washing section. In the washing section, the ion-conducting membrane is preferably subjected to immersion and washing in washing water in multiple stages to remove and reduce the treatment solution attached to and osmosed into the ion-conducting membrane. Herein, the phrase that the ion-conducting membrane is "subjected to immersion washing in multiple stages" means to sequentially immerse and wash the ion-conducting membrane in a washing tank divided into at least two stages. Immersion washing in multiple stages can efficiently remove any excess treatment solution. Immersion washing in three or more stages is more preferable. This is because the amount of use of washing water can be reduced. The washing water used is preferably deionized water. Use of washing water makes it possible to osmose impurity ions contained in the washing water into the ion-conducting membrane, and to prevent impurity ions from remaining in the ion-conducting membrane. Moreover, the washing section preferably has a mechanism that subjects the ion-conducting membrane to shower washing in deionized water in multiple stages. Herein, the phrase "shower washing in multiple stages" means to subject the conveyed ion-conducting membrane to shower washing every time the ion-conducting membrane gets out of one washing tank. With these mechanisms, it is possible to quickly remove any foreign matter suspended on the surface of the washing tank if it is attached to the membrane. In the device that produces an ion-conducting membrane, the washing section more preferably has a mechanism that subjects the ion-conducting membrane to immersion washing in deionized water in multiple stages, and a mechanism that subjects the ion-conducting membrane to shower washing in multiple stages. This is because impurities as well as any attached foreign matter can be removed from the ion-conducting membrane.

The drying mechanism in the drying section that dries the washed ion-conducting membrane is not particularly limited. In general, the drying section preferably has a mechanism that dries the ion-conducting membrane with hot air. In the device that produces an ion-conducting membrane, the drying section preferably has a mechanism including a suction conveying roll of which at least a roll surface is made from a porous material and connects to the decompression device to improve drying efficiency. With the mechanism, the washing water can be removed more easily.

Figure 3:
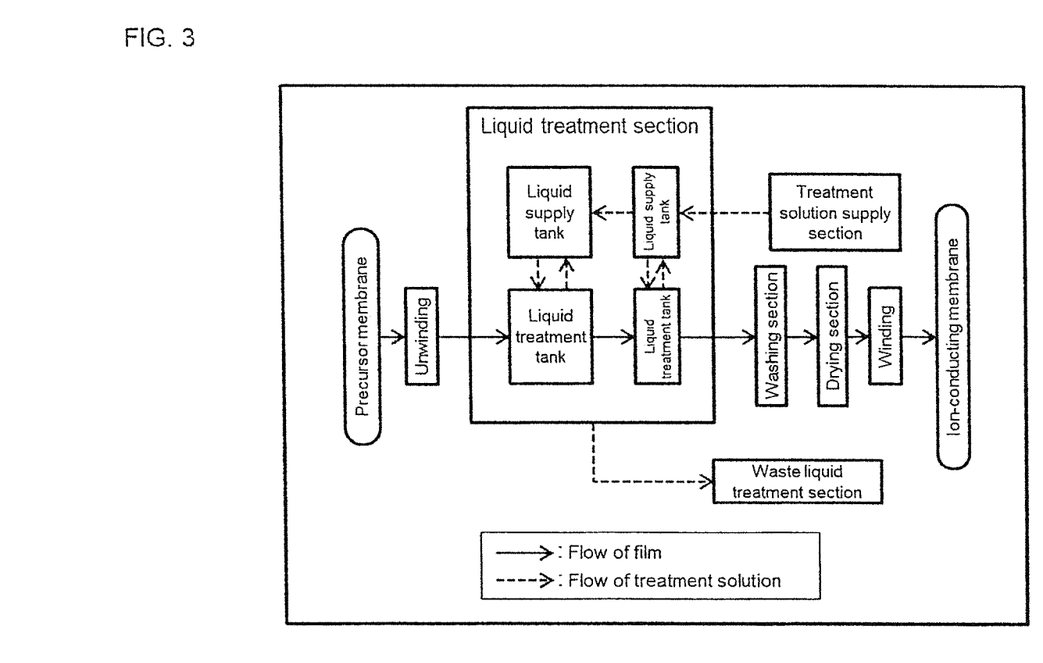
FIG. 3 is a diagram showing one example of the production device.
Figure 4:
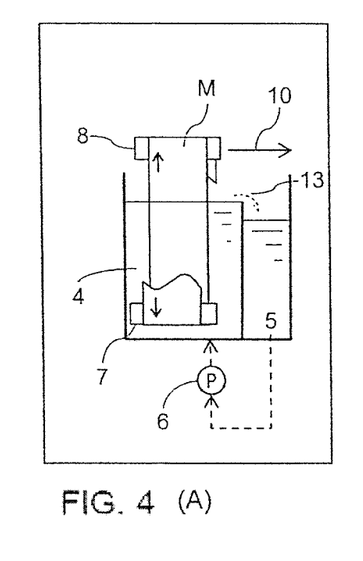

In the example shown in FIG. 3, the ion-conducting membrane that has passed through the drying section is conveyed to a winding section, and wound into a roll by a winding roller, whereby the whole process is completed. In the device that produces an ion-conducting membrane, the winding section preferably has a mechanism that winds up the ion-conducting membrane with a winding tension being controlled to be constant to maintain the roll shape well in winding. Herein, the phrase that "the winding tension is constant" means that the winding tension has an accuracy at most within ±20% of the set tension.

The invention claimed is:

1. A method of producing an ion-conducting membrane containing a polymer having an ionic group comprising:
a plurality of times of liquid treatment steps of bringing a precursor membrane that contains a polymer containing a salt of the ionic group with an impurity ion into contact with an acid treatment solution or an alkali treatment solution,
wherein, in the plurality of times of liquid treatment steps, a liquid treatment time in each of second and subsequent liquid treatment steps is shorter than a liquid treatment time in a first liquid treatment step.

2. The production method according to claim 1, wherein the liquid treatment time in each of the second and subsequent liquid treatment steps is two-thirds or less of the liquid treatment time in the first liquid treatment step.

3. A production device that produces an ion-conducting membrane containing a polymer having an ionic group comprising:
a plurality of liquid treatment tanks that brings a precursor membrane containing a polymer having the ionic group capable of forming a salt with an impurity ion into contact with an acid treatment solution or an alkali treatment solution,
wherein, in the plurality of liquid treatment tanks, second and subsequent liquid treatment tanks are smaller than a first liquid treatment tank.

4. The production device according to claim 3, wherein the second and subsequent liquid treatment tanks each have an internal volume two-thirds or less of an internal volume of the first liquid treatment tank.

5. The production device according to claim 3, further comprising a liquid treatment section for a precursor membrane including a liquid treatment tank and a liquid supply tank adjacent to the liquid treatment tank, the device having a mechanism that circulates a treatment solution sent from the liquid supply tank to the liquid treatment tank and overflowed from the liquid treatment tank to the liquid supply tank, and a mechanism that supplies a new treatment solution.

6. The production device according to claim 5, wherein the liquid treatment section includes a plurality of liquid treatment tanks, and liquid supply tanks equal in number with the liquid treatment tanks.

7. The production device according to claim 5, wherein a direction in which the treatment solution overflows from the liquid treatment tank is a direction parallel to a surface of the precursor membrane at the time the precursor membrane intersects with the surface of the treatment solution.

8. The production device according to claim 3, further comprising, following the liquid treatment section, a washing section in which an ion-conducting membrane obtained by liquid treatment of the precursor membrane is washed, a drying section in which the washed ion-conducting membrane is dried, and a winding section in which the dried ion-conducting membrane is wound up.

9. The production device according to claim 8, wherein the washing section has a mechanism that subjects the ion-conducting membrane to immersion washing in deionized water in multiple stages, and a mechanism that subjects the ion-conducting membrane to shower washing in multiple stages.

10. The production device according to claim 8, wherein the drying section has a mechanism including a decompression device, and a suction conveyor roll of which at least a roll surface is made from a porous material and connects to the decompression device.

11. The production device according to claim 8, wherein the winding section has a mechanism that winds up the ion-conducting membrane with a winding tension being controlled to be constant.

12. The production device according to claim 5, comprising a mechanism that individually controls a liquid sending speed from the liquid supply tank to the liquid treatment tank.

13. The production device according to claim 4, further comprising a liquid treatment section for a precursor membrane including a liquid treatment tank and a liquid supply tank adjacent to the liquid treatment tank, the device having a mechanism that circulates a treatment solution sent from the liquid supply tank to the liquid treatment tank and overflowed from the liquid treatment tank to the liquid supply tank, and a mechanism that supplies a new treatment solution.

14. The production device according to claim 6, wherein a direction in which the treatment solution overflows from the liquid treatment tank is a direction parallel to a surface of the precursor membrane at the time the precursor membrane intersects with the surface of the treatment solution.

15. The production device according to claim 4, further comprising, following the liquid treatment section, a washing section in which an ion-conducting membrane obtained by liquid treatment of the precursor membrane is washed, a drying section in which the washed ion-conducting membrane is dried, and a winding section in which the dried ion-conducting membrane is wound up.

16. The production device according to claim 5, further comprising, following the liquid treatment section, a washing section in which an ion-conducting membrane obtained by liquid treatment of the precursor membrane is washed, a drying section in which the washed ion-conducting membrane is dried, and a winding section in which the dried ion-conducting membrane is wound up.

17. The production device according to claim 6, further comprising, following the liquid treatment section, a washing section in which an ion-conducting membrane obtained by liquid treatment of the precursor membrane is washed, a drying section in which the washed ion-conducting membrane is dried, and a winding section in which the dried ion-conducting membrane is wound up.

18. The production device according to claim 7, further comprising, following the liquid treatment section, a washing section in which an ion-conducting membrane obtained by liquid treatment of the precursor membrane is washed, a drying section in which the washed ion-conducting membrane is dried, and a winding section in which the dried ion-conducting membrane is wound up.

19. The production device according to claim 9, wherein the drying section has a mechanism including a decompression device, and a suction conveyor roll of which at least a roll surface is made from a porous material and connects to the decompression device.

\* \* \* \* \*

UNITED STATES PATENT AND TRADEMARK OFFICE
CERTIFICATE OF CORRECTION

PATENT NO. : 10,774,190 B2
APPLICATION NO. : 16/074145
DATED : September 15, 2020
INVENTOR(S) : Fukuda et al.

It is certified that error appears in the above-identified patent and that said Letters Patent is hereby corrected as shown below:

In the Specification

In Column 4
Line 14, please change "(-O-(CF$_2$)-SO$_2$(OH))" to --(-O-(CF$_2$)$n$-SO$_2$(OH))--.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*